United States Patent
Chaudhuri et al.

(10) Patent No.: US 8,787,167 B2
(45) Date of Patent: Jul. 22, 2014

(54) SYSTEM AND METHOD FOR BALANCING UPLINK BANDWIDTH UTILIZATION IN A RELAY ASSISTED CELLULAR NETWORK

(75) Inventors: Saptarshi Chaudhuri, Bangalore (IN); Subhodeep Sarkar, Kolkata (IN)

(73) Assignee: Wipro Limited, Bangalore (IN)

( * ) Notice: Subject to any disclaimer, the term of this patent is extended or adjusted under 35 U.S.C. 154(b) by 196 days.

(21) Appl. No.: 13/594,781

(22) Filed: Aug. 25, 2012

(65) Prior Publication Data

US 2013/0250766 A1    Sep. 26, 2013

(30) Foreign Application Priority Data

Mar. 21, 2012 (IN) .......................... 1037/CHE/2012

(51) Int. Cl.
*H04W 28/10* (2009.01)
*H04W 72/04* (2009.01)
*H04W 72/12* (2009.01)

(52) U.S. Cl.
CPC ...... *H04W 72/0413* (2013.01); *H04W 72/1268* (2013.01); *H04W 72/1242* (2013.01)
USPC ........... 370/235; 370/231; 370/326; 370/338; 455/450; 455/9

(58) Field of Classification Search
CPC ......... H04W 72/00–72/1268; H04W 28/0205; H04W 28/08; H04W 84/047; H04B 7/155; H04L 47/125
USPC ............... 370/230–401; 455/7, 9, 450, 452.1, 455/452.2, 453, 509
See application file for complete search history.

(56) References Cited

U.S. PATENT DOCUMENTS

| Patent | Date | Inventor | Page |
|---|---|---|---|
| 7,366,178 B2 * | 4/2008 | Lee et al. | 370/395.4 |
| 7,646,752 B1 | 1/2010 | Periyalwar et al. | |
| 7,792,130 B2 | 9/2010 | Fischer | |
| 7,995,493 B2 | 8/2011 | Anderlind et al. | |
| 8,032,146 B2 | 10/2011 | Zhu et al. | |
| 2008/0188231 A1 | 8/2008 | Zhu et al. | |
| 2009/0003260 A1 | 1/2009 | Guo et al. | |
| 2009/0196177 A1 * | 8/2009 | Teyeb et al. | 370/231 |
| 2009/0201846 A1 | 8/2009 | Horn et al. | |
| 2010/0226276 A1 * | 9/2010 | Sampath et al. | 370/252 |
| 2010/0255773 A1 | 10/2010 | Halfmann | |
| 2011/0044192 A1 * | 2/2011 | Wang et al. | 370/252 |
| 2011/0151774 A1 | 6/2011 | Li et al. | |
| 2011/0201341 A1 * | 8/2011 | Choudhury et al. | 455/450 |
| 2011/0261747 A1 * | 10/2011 | Wang et al. | 370/315 |
| 2011/0269393 A1 * | 11/2011 | Ostergaard et al. | 455/7 |
| 2011/0310814 A1 * | 12/2011 | Callard et al. | 370/329 |

\* cited by examiner

*Primary Examiner* — Afsar M Qureshi
(74) *Attorney, Agent, or Firm* — LeClairRyan, A Professional Corporation

(57) ABSTRACT

A system and method for balancing uplink (UL) bandwidth utilization in a relay assisted cellular network are disclosed. In one embodiment, scheduler context data associated with one or more mobile users/devices connected to the relay assisted cellular network is obtained. Further, static and dynamic load values of data packets coming from the one or more mobile users or devices are computed using the obtained scheduler context data. Furthermore, UL bandwidth utilization between the one or more mobile users or devices and a base station in the relay assisted cellular network is balanced using the computed static and dynamic load values.

21 Claims, 7 Drawing Sheets

SYSTEM AND METHOD FOR BALANCING UPLINK BANDWIDTH UTILIZATION IN A RELAY ASSISTED CELLULAR NETWORK

CROSS-REFERENCE TO RELATED APPLICATIONS

Benefit is claimed under 35 U.S.C 119(a)-(d) to Foreign Application Serial No. 1037/CHE/2012, filed in INDIA entitled "SYSTEM AND METHOD FOR BALANCING UPLINK BANDWIDTH UTILIZATION IN A RELAY ASSISTED CELLULAR NETWORK" filed on Mar. 21, 2012 by Wipro Limited, which is herein incorporated in its entirety by reference for all purposes.

TECHNICAL FIELD

Embodiments of the present subject matter relate to a wireless communication network. More particularly, embodiments of the present subject matter relate to balancing uplink (UL) bandwidth utilization in a relay assisted cellular network.

BACKGROUND

Third generation partnership project (3GPP) standard for a relay assisted cellular network suggests using two parameters, one being a logical channel priority and the other being a scheduling grant size for uplink (UL) scheduling. The existing solutions for the UL scheduling are based on sharing of a load status indicator bit between RNs, attaching priorities based on a data rate of each of the application data packets, creation of virtual links with predetermined bandwidth support, time division scheduling per link basis, consolidated UL buffer status reporting and so on. However, these UL scheduling solutions have inefficiencies and associated issues, such as deviation from standards, inability to handle complex needs of different application priorities, administrative overheads, inefficient utilization of UL backhaul resources, lack of fair scheduling and overload handling.

SUMMARY

A system and method for balancing uplink (UL) bandwidth utilization in a relay assisted cellular network are disclosed. According to one aspect of the present subject matter, scheduler context data associated with one or more mobile users/devices connected to the relay assisted cellular network is obtained. Further, static and dynamic load values of data packets coming from the one or more mobile users/devices are computed using the obtained scheduler context data. Furthermore, UL bandwidth utilization between the one or more mobile users/devices and a base station in the relay assisted cellular network is balanced using the computed static and dynamic load values.

According to another aspect of the present subject matter, a relay assisted cellular network system includes a plurality of relay nodes (RNs), the one or more mobile users/devices coupled to each RN, and the base station coupled to the plurality of RNs via associated ULs. Further, each RN includes an intelligent UL bandwidth load balancer. Furthermore, the intelligent UL bandwidth load balancer obtains scheduler context data associated with the one or more mobile users/devices. In addition, the intelligent UL bandwidth load balancer computes static and dynamic load values of the data packets coming from the one or more mobile users/devices using the obtained scheduler context data. Moreover, the intelligent UL bandwidth load balancer balances UL bandwidth utilization between the one or more mobile users/devices and the base station using the computed static and dynamic load values.

According to yet another aspect of the present subject matter, the intelligent UL bandwidth load balancer includes a scheduler context module for obtaining scheduler context data associated with the one or more mobile users/devices. Further, the intelligent UL bandwidth load balancer includes a static and dynamic load calculation module for computing the static and dynamic load values of the data packets coming from the one or more mobile users/devices using the obtained scheduler context data. Furthermore, the intelligent UL bandwidth load balancer includes an UL bandwidth load balancing module for balancing the UL bandwidth utilization between the one or more mobile users/devices and the base station using the computed static and dynamic load values.

According to an aspect of the present subject matter, a non-transitory computer-readable storage medium for balancing the UL bandwidth utilization in the relay assisted cellular network, having instructions that, when executed by a computing device causes the computing device to perform the method described above.

The system and method disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for balancing uplink (UL) bandwidth utilization in a relay assisted cellular network are disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
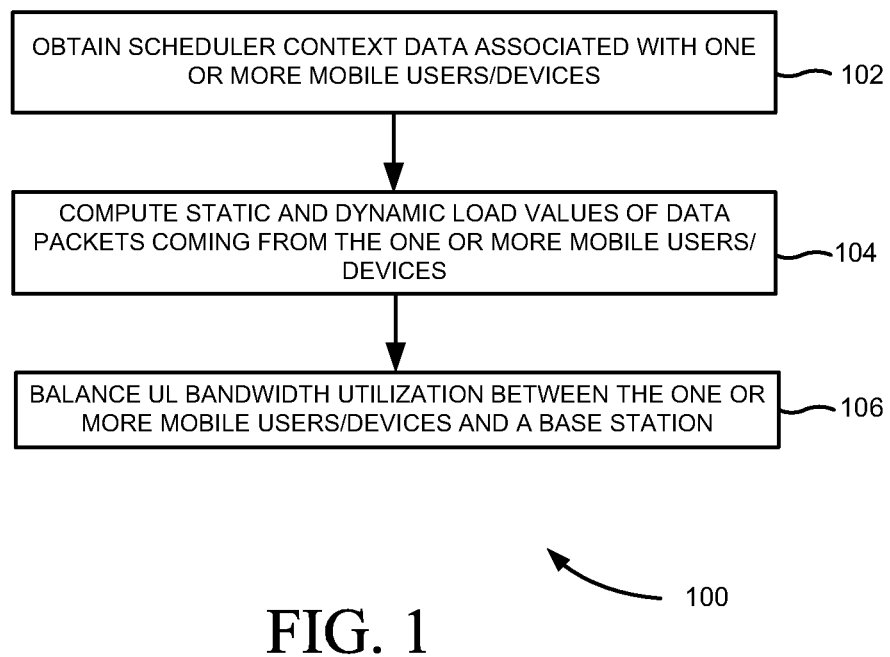
FIG. 1 illustrates a flowchart of a method for balancing uplink (UL) bandwidth utilization in a relay assisted cellular network, according to one embodiment.

FIG. 1 illustrates a flowchart 100 of a method for balancing UL bandwidth utilization in a relay assisted cellular network, according to one embodiment. At block 102, scheduler context data associated with one or more mobile users/devices connected to the relay assisted cellular network is obtained. Exemplary scheduler context data includes a number of mobile devices connected to the relay assisted cellular network, a number of users of different traffic class types, random priorities of each traffic class type users, guaranteed bit rates (GBRs) for the traffic class types, an operator's operational load window, operator's running average parameters, an average initial load to start the algorithm, a constant load factor, a percentage of users that can be added for different traffic class types, a trigger hand over (HO) constant, an intelligent UL bandwidth load balancer enabler and the like. For example, the number of users of different traffic class types includes a constant bit rate (CBR), ON_OFF, statistically distributed traffic pattern and the like. The scheduler context data further includes user context information, such as a traffic class type, an average throughput, a normalized rate deficit, a normalized weight factor and the like.

At block 104, static and dynamic load values of data packets coming from the one or more mobile users/devices are computed using the obtained scheduler context data. In one embodiment, UL bandwidth lower operating points are computed. Further, UL bandwidth load utilization for each mobile user/device requiring UL scheduling is computed. At block 106, UL bandwidth utilization between the one or more mobile users/devices and a base station in the relay assisted cellular network is balanced using the computed static and dynamic load values. In one embodiment, throughput of each mobile user/device is substantially continually adjusted as scheduled by adding needed weights based on a priority and a rate deficit. Further, UL bandwidth load utilization is recalculated and compared with the computed UL bandwidth higher and lower operating points. Furthermore, any time delay/latency required for modified mobile user/device throughput is notified. In addition, HO decisions are notified. This is explained in more detail with reference to FIG. 7. In one exemplary implementation, balancing of the UL bandwidth utilization can be dynamically turned on and off in the relay assisted cellular network. A pseudo code for the method 100 is described in Appendix A of the present disclosure.

Figure 2:
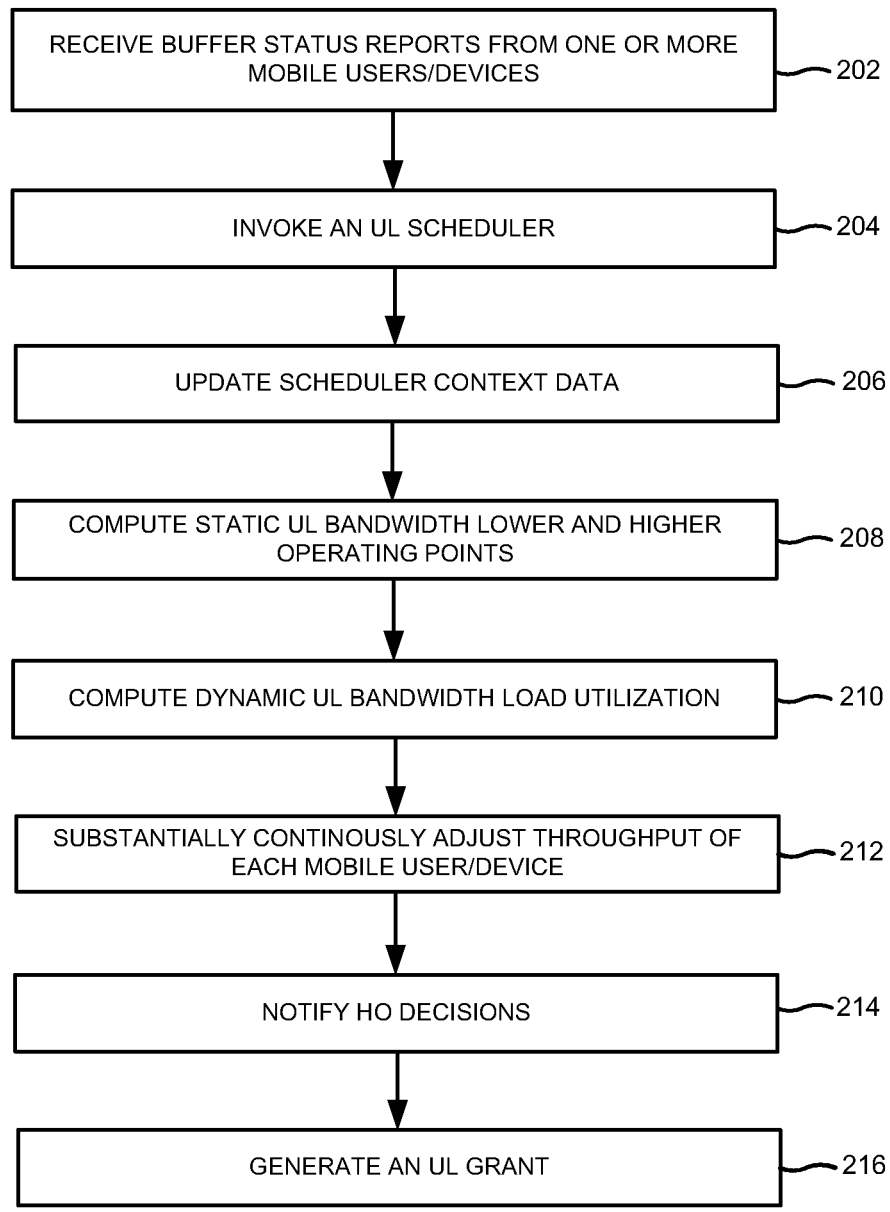
FIG. 2 illustrates another flowchart of a method for balancing the UL bandwidth utilization in the relay assisted cellular network, according to one embodiment.

Referring now to FIG. 2, which is another flowchart 200 of a method for balancing UL bandwidth utilization in a relay assisted cellular network, according to one embodiment. At block 202, buffer status reports are received by a relay-user equipment (UE) module, in a relay node (RN), from one or more mobile users/devices connected to the relay assisted cellular network. At block 204, an UL scheduler, in the RN, is invoked by the relay-UE module. At block 206, scheduler context data is updated by an intelligent UL bandwidth load balancer, in the RN, using feed backs received from an operations, administration and management (OA and M) and relay module and a call processing module in a relay-evolved node B (eNB) module. This is explained in more detail with reference to FIG. 7. At block 208, static UL bandwidth lower and higher operating points are computed. At block 210, a dynamic UL bandwidth load utilization for each mobile user/device requiring UL scheduling is computed. At block 212, throughput of each mobile user/device is substantially continually adjusted as scheduled, by the UL scheduler, by adding needed weights based on a priority and a rate deficit. At block 214, HO decisions are notified to the call processing module, a downlink (DL) scheduler, the UL scheduler and a radio resource management (RRM) module. This is explained in more detail with reference to FIG. 7. At block 216, an UL grant is generated by the UL scheduler.

Figure 3:
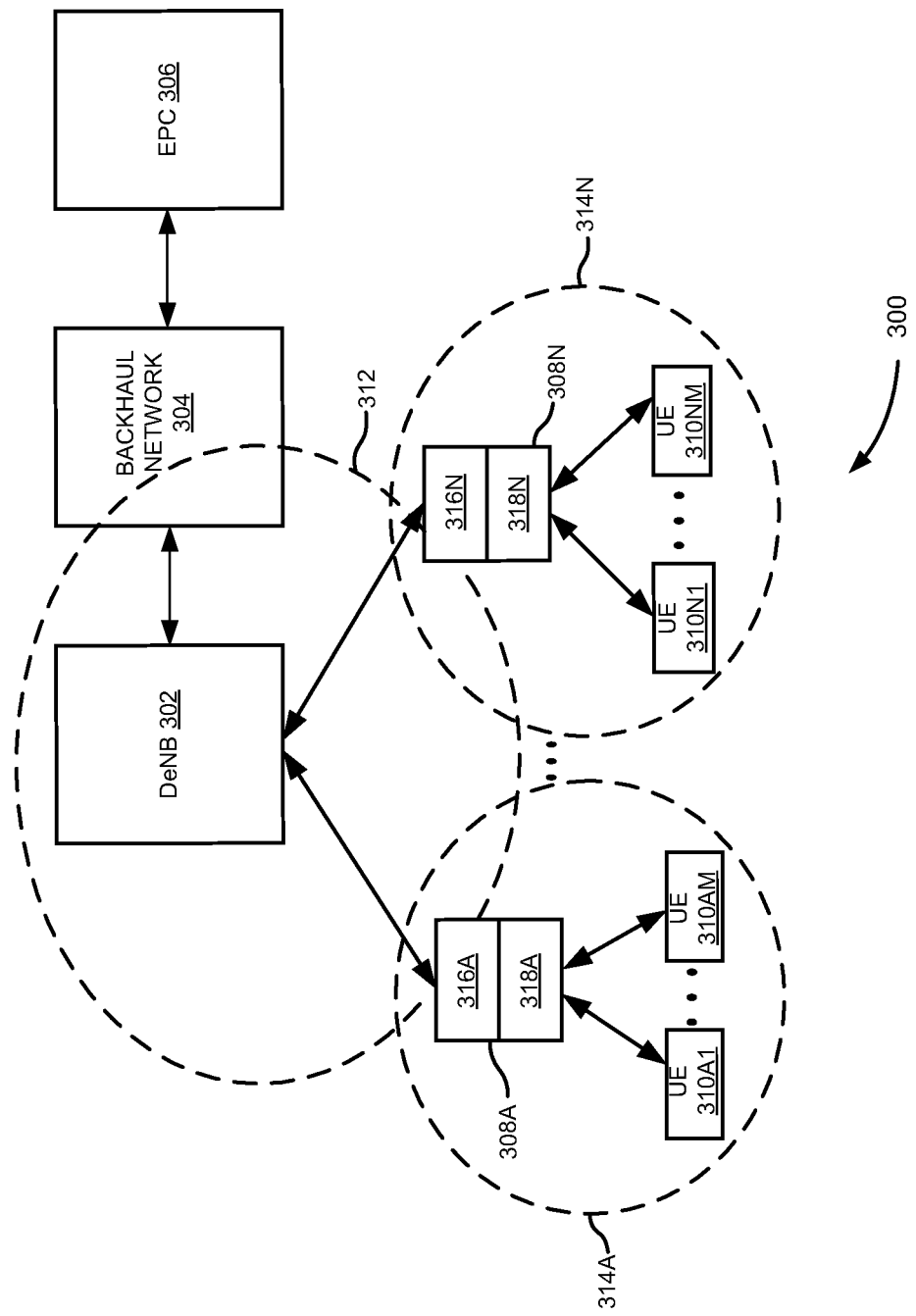
FIG. 3 illustrates a relay assisted cellular network architecture, in the context of the present subject matter.

Referring now to FIG. 3, which illustrates a relay assisted cellular network architecture 300, in the context of the present subject matter. As shown in FIG. 3, the relay assisted cellular network architecture 300 includes a donor evolved node B (DeNB) 302 (i.e., a base station), a backhaul network 304, an evolved packet core (EPC) 306, a plurality of RNs 308A-N and a plurality of UEs 310A1-AM to 310N1-NM. Exemplary UEs include mobile devices and the like. Further, the RNs 308A-N includes associated relay-UE modules 316A-N and relay-eNB modules 318A-N.

Furthermore as shown in FIG. 3, the DeNB 302 is communicatively coupled to the RNs 308A-N and the backhaul network 304. In addition, the backhaul network 304 is communicatively coupled to the EPC 306. Moreover, the RNs 308A-N are communicatively coupled to the associated UEs 310A1-AM to 310N1-NM. Also, 312 indicates coverage area of the DeNB 302. Further, the 314A-N indicate coverage areas of the associated RNs 308A-N. In one embodiment, the RNs 308A-N are placed in the coverage area 312 of the DeNB 302. Furthermore, each of the plurality of UEs 310A1-AM to 310N1-NM can access to the DeNB 302 or the associated one of the RNs 308A-N according to specific conditions. For example, the UE accessing to the DeNB 302 is referred as an UE in a DeNB 302 domain, which is scheduled by the DeNB 302 and the UE accessing to an RN is referred as an UE in a RN domain. In addition, each of the RNs 308A-N includes the DeNB 302 properties in a DL direction (i.e., from the RNs 308A-N to associated UEs 310A1-AM to 310N1-NM). Also, each of the RNs 308A-N includes associated UE properties in an UL direction (i.e., from RNs 308A-N to the DeNB 302).

Figure 4:
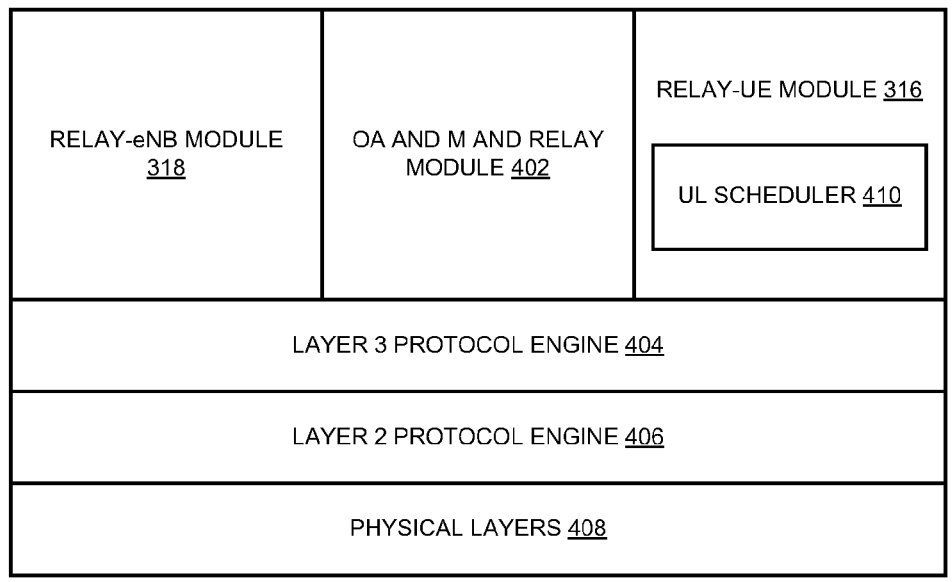
FIG. 4 illustrates a layered architecture of a relay node (RN), such as the one shown in FIG. 3, in the context of the present subject matter.

Referring now to FIG. 4, which is a layered architecture 400 of the RN 308, such as the one shown in FIG. 3, in the context of the present subject matter. As shown in FIG. 4, the layered architecture 400 includes the relay-eNB module 318, an OA and M and relay module 402, the relay-UE module 316, a layer 3 protocol engine 404, a layer 2 protocol engine 406 and physical layers 408. Furthermore, the relay-UE module 316 includes an UL scheduler 410.

For example, the physical layers 408 are used for communication with the UEs 310A1-AM to 310N1-NM and the DeNB 302. Some of the key functionalities of the physical layers 408 include orthogonal frequency-division multiplexing (OFDM) modulation and coding, resource partitioning, and multiplexing.

The layer 2 protocol engine 406 is responsible for handling of control plane and user plane protocol messages based on a current state of the layer 2 protocol engine 406. Some of the key functionalities of the layer 2 protocol engine 406 include header compression and encryption of user level internet protocol (IP) packets, error recovery and flow control, hybrid automatic repeat request (HARQ), and scheduling.

The layer 3 protocol engine 404 is responsible for handling of control plane and user plane protocol messages based on a current state of the layer 3 protocol engine 404. Some of the key functionalities of the layer 3 protocol engine 404 include session management, security, radio management and mobility management.

The relay-eNB module 318 includes multiple components responsible for various operations performed from the acceptance of an incoming call through final disposition of the call. In addition to the above, the relay-eNB module 318 is responsible for mobility management and DL scheduling.

The relay-UE module 316 includes multiple components responsible for various operations performed from the acceptance of the incoming call through the final disposition of the call. In addition to the above, the relay-UE module 316 is responsible for the UL scheduling. The OA and M and relay module 402 includes processes, activities, tools, standards, and the like involved with operating, administering, managing and maintaining the relay assisted cellular network.

Figure 5:
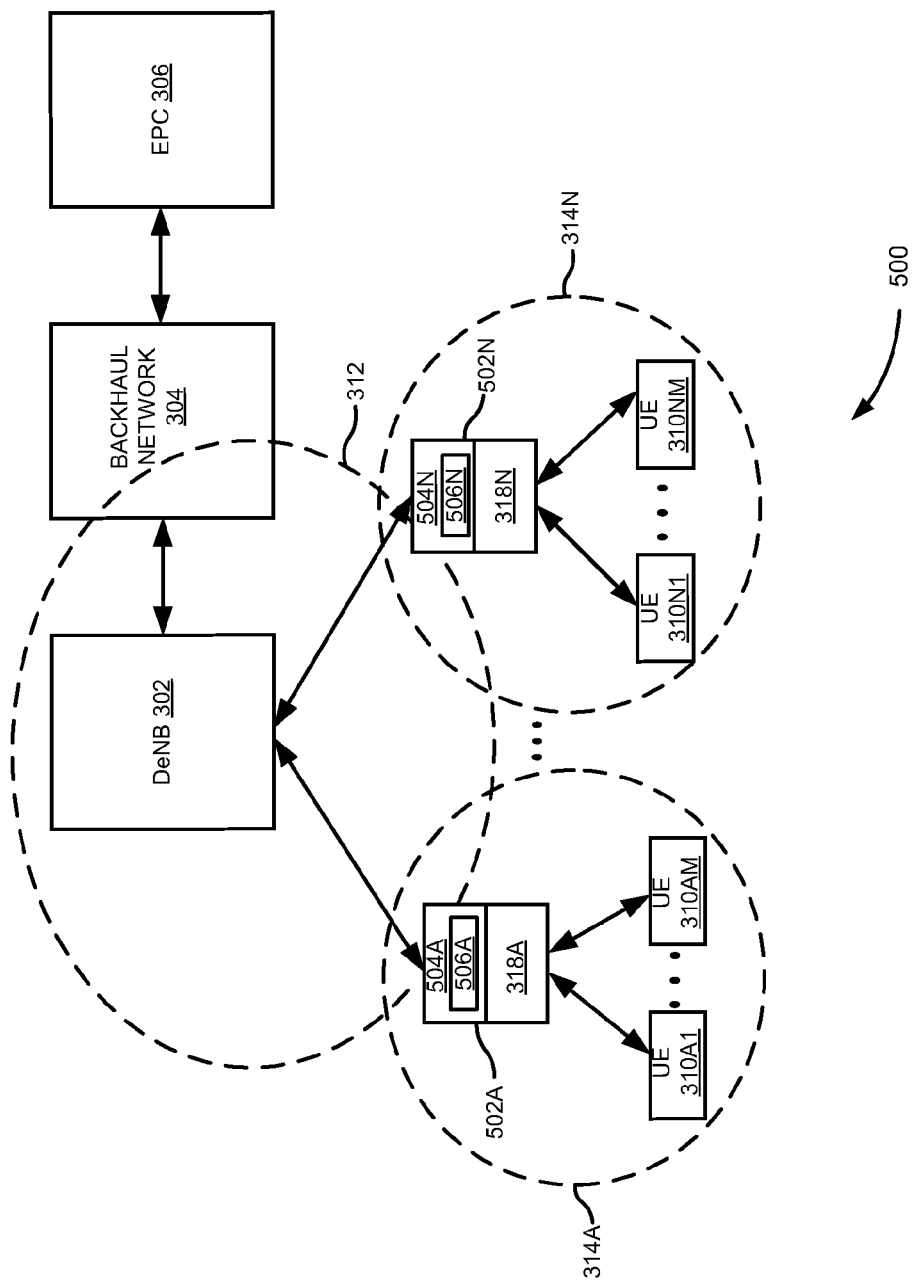
FIG. 5 illustrates a relay assisted cellular network architecture, according to one embodiment.

Referring now to FIG. 5, which illustrates a relay assisted cellular network architecture 500, according to one embodiment. As shown in FIG. 5, the relay assisted cellular network architecture 500 includes the DeNB 302, the backhaul network 304, the EPC 306, a plurality of RNs 502A-N and the plurality of UEs 310A1-AM to 310N1-NM. Further, the RNs 502A-N includes associated relay-UE modules 504A-N and relay-eNB modules 318A-N. Furthermore, relay-UE modules 504A-N includes associated intelligent UL bandwidth load balancers 506A-N.

In addition as shown in FIG. 5, the DeNB 302 is communicatively coupled to the RNs 502A-N and the backhaul network 304. Moreover, the backhaul network 304 is communicatively coupled to the EPC 306. Also, the RNs 502A-N are communicatively coupled to the associated UEs 310A1-AM to 310N1-NM. Further, the 312 indicates coverage area of the DeNB 302. Furthermore, the 314A-N indicate coverage areas of the associated RNs 502A-N. In addition, each of the intelligent UL bandwidth load balancers 506A-N handle efficient UL packet scheduling for each of the application or service types for maintaining and balancing UL bandwidth utilization between the RNs 502A-N and DeNB 302. This is explained in more detail with reference to FIG. 7.

Figure 6:
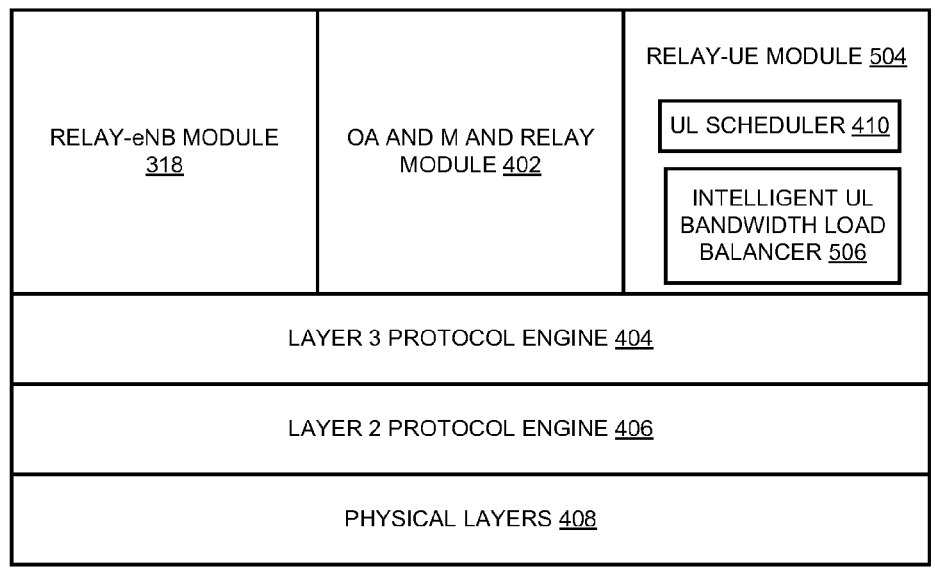
FIG. 6 illustrates a layered architecture of a RN, such as the one shown in FIG. 5, according to one embodiment.

Referring now to FIG. 6, which illustrates a layered architecture 600 of the RN 502, such as the one shown in FIG. 5, according to one embodiment. As shown in FIG. 6, the layered architecture 600 includes the relay-eNB module 318, the OA and M and relay module 402, a relay-UE module 504, the layer 3 protocol engine 404, the layer 2 protocol engine 406 and physical layers 408. Furthermore, the relay-UE module 504 includes the UL scheduler 410 and the intelligent UL bandwidth load balancer 506. In addition, the intelligent UL bandwidth load balancer 506 handles efficient UL packet scheduling for each of the application or service types for maintaining and balancing UL bandwidth utilization between the RNs 502A-N and DeNB 302. This is explained in more detail with reference to FIG. 7.

Figure 7:
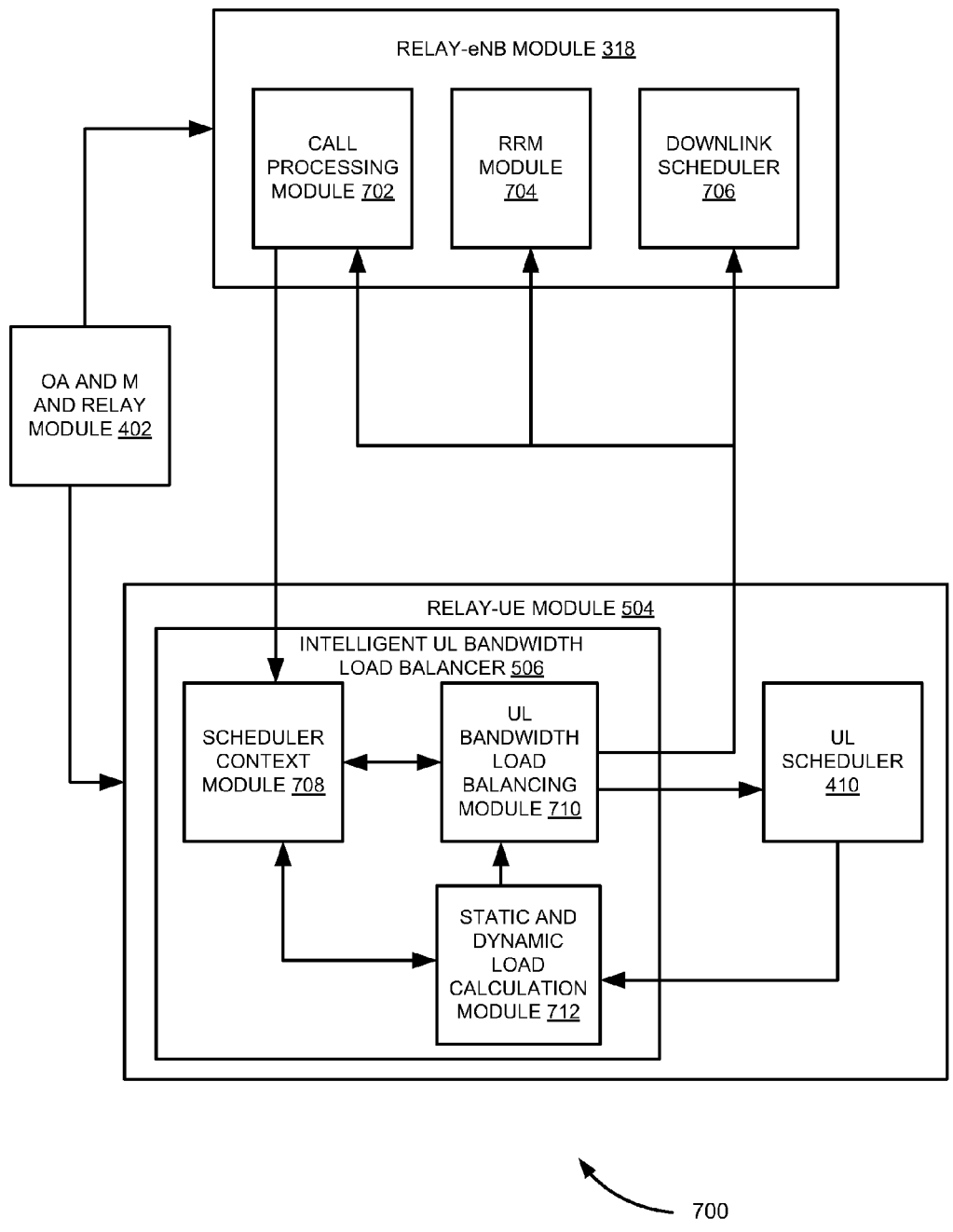
FIG. 7 is a block diagram illustrating some of the major modules of an intelligent UL bandwidth load balancer shown in FIG. 5 and their interconnectivity, according to one embodiment.

Referring now to FIG. 7, which is a block diagram 700 that illustrates some of the major modules of the intelligent UL bandwidth load balancer 506 shown in FIG. 5 and their interconnectivity, according to one embodiment. As shown in FIG. 7, the block diagram 700 includes the relay-eNB module 318, the relay-UE module 504, and the OA and M and relay module 402. Further, the relay-eNB module 318 includes a call processing module 702, a RRM module 704, and a DL scheduler 706. Furthermore, the relay-UE module 504 includes the intelligent UL bandwidth load balancer 506 and the UL scheduler 410. In addition, the intelligent UL bandwidth load balancer 506 includes a scheduler context module 708, an UL bandwidth load balancing module 710, and a static and dynamic load calculation module 712.

Moreover as shown in FIG. 7, the OA and M and relay module 404 is communicatively coupled to the relay-eNB module 318 and the relay-UE module 504. Also, the UL bandwidth load balancing module 710 is coupled to the UL scheduler 410, the DL scheduler 706, the RRM module 704, and the call processing module 702. Further, the UL bandwidth load balancing module 710 is communicatively coupled to the scheduler context module 708. Furthermore, the static and dynamic load calculation module 712 is coupled to the UL bandwidth load balancing module 710. In addition, the UL scheduler 410 is coupled to the static and dynamic load calculation module 712. Moreover, the static and dynamic load calculation module 712 is communicatively coupled to the scheduler context module 708. Also, the call processing module 702 is coupled to the scheduler context module 708.

In one embodiment, the scheduler context module 708 obtains scheduler context data associated with one or more mobile users/devices connected to the relay assisted cellular network. Exemplary scheduler context data includes a number of mobile devices connected to the relay assisted cellular network, a number of users of different traffic class types, random priorities of each traffic class type users, GBRs for the traffic class types, an operator's operational load window, operator's running average parameters, an average initial load to start the algorithm, a constant load factor, a percentage of mobile users that is added for different traffic class types, a trigger HO constant, an intelligent UL bandwidth load balancer enabler and the like. For example, the number of users of different traffic class types includes a CBR, ON_OFF, statistically distributed traffic pattern and the like. The scheduler context data further includes user context information, such as a traffic class type, an average throughput, a normalized rate deficit, a normalized weight factor and the like. In one exemplary implementation, the OA and M and relay module 402 updates parameters, such as the mobile/device traffic class types, associated priorities, operator's load window constants, operator's running average parameters, a constant load factor, trigger HO count, a percentage of mobile users that is added for different traffic class types, intelligent UL bandwidth load balancer enabler in the scheduler context data. The call processing module 702 updates parameters, such as the number of mobiles/devices and the like in the scheduler context data.

Further, the static and dynamic load calculation module 712 computes UL bandwidth lower and higher operating points. Furthermore, the static and dynamic load calculation module 712 computes UL bandwidth load utilization for each mobile user/device requiring UL scheduling. In one embodiment, the static and dynamic load calculation module 712 performs effective UL scheduling by dynamically calculating the UL bandwidth load utilization using parameters, such as the number of mobile devices, traffic class types, GBR, average initial load and user-context data like average throughput in the scheduler context data. The static and dynamic load calculation module 712 further updates user-context data, such as the normalized rate deficit and the like.

In addition, the UL bandwidth load balancing module 710 substantially continually adjusts throughput of each mobile user/device as scheduled by adding needed weights based on a priority and a rate deficit. Moreover, the UL bandwidth load balancing module 710 re-calculates UL bandwidth load utilization and compares with the computed UL bandwidth higher and lower operating points. Also, the decision of adding more mobile users is communicated to the call processing module 702 to add pre-calculated number of different traffic class users.

Further, the UL bandwidth load balancing module 710 notifies any time delay/latency required for modified mobile user/device throughput to the DL scheduler 706 and UL scheduler 410. Furthermore, the UL bandwidth load balancing module 710 notifies HO decisions to RRM module 704. In one exemplary implementation, the UL bandwidth load balancing module 710 balances the UL bandwidth load utilization by continuously adjusting user throughput by using parameters, such as the constant load factor, percentage of mobile users that is added for different traffic class types, trigger HO constant etc., and user-context data, such as the normalized rate deficit and weight factor and the like. For example, the balancing of the UL bandwidth utilization in the relay assisted cellular network can be dynamically turned on and off by setting the intelligent UL bandwidth load balancer enabler to one and zero, respectively.

In various embodiments, systems and methods described with reference to FIGS. 1 through 7 propose the intelligent UL bandwidth load balancer, in the RN, for balancing UL bandwidth utilization in the relay assisted cellular network. Further, the intelligent UL bandwidth load balancer can be turned on and off depending on the RN dynamic behavior or operator's initial static configuration. Furthermore, the intelligent UL bandwidth load balancer handle efficient UL packet scheduling for each of the application or service types for maintaining and balancing UL bandwidth utilization between the RNs and the base station.

Although certain methods, systems, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for balancing uplink (UL) bandwidth utilization in a relay assisted cellular network, comprising:
    obtaining, by a load balancing computing device, scheduler context data associated with one or more mobile users/devices connected to the relay assisted cellular network;
    computing, by the load balancing computing device, static and dynamic load values of data packets coming from the one or more mobile users/devices using the obtained scheduler context data; and
    balancing, by the load balancing computing device, UL bandwidth utilization between the one or more mobile users or devices and a base station in the relay assisted cellular network using the computed static and dynamic load values, wherein the balancing further comprises continually adjusting throughput of each mobile user or device by adding needed weights based on a priority and a rate deficit according to a schedule.

2. The method of claim 1, wherein the scheduler context data comprises one or more of a number of mobile devices connected to the relay assisted cellular network, a number of users of different traffic class types, random priorities of each traffic class type users, guaranteed bit rates (GBRs) for the traffic class types, an operator's operational load window, operator's running average parameters, an average initial load to start the algorithm, a constant load factor, a percentage of mobile users that is added for different traffic class types, a trigger handover (HO) constant, or an intelligent UL bandwidth load balancer enabler.

3. The method of claim 2, wherein the number of users of different traffic class types comprises a constant bit rate (CBR), ON_OFF and/or statistically distributed traffic pattern.

4. The method of claim 2, wherein the scheduler context data further comprises user context information comprising a traffic class type, an average throughput, a normalized rate deficit, and a normalized weight factor.

5. The method of claim 1, wherein computing the static and dynamic load values comprises:
    computing, by the load balancing computing device, UL bandwidth lower and higher operating points; and
    computing, by the load balancing computing device, UL bandwidth load utilization for each mobile user/device requiring UL scheduling.

6. The method of claim 1, wherein balancing UL bandwidth utilization comprises:
    re-calculating, by the load balancing computing device, UL bandwidth load utilization and comparing with the computed UL bandwidth lower and higher operating points;
    notifying, by the load balancing computing device, any time delay or latency required for modified mobile user/device throughput; and
    notifying, by the load balancing computing device, one or more hand over (HO) decisions.

7. The method of claim 1, further comprising:
    dynamically, by the load balancing computing device, turning on and off the balancing of the UL bandwidth utilization in the relay assisted cellular network.

8. A non-transitory computer readable medium having stored thereon instructions for balancing uplink (UL) bandwidth utilization in a relay assisted cellular network comprising executable code which when executed by a processor, causes the processor to perform steps comprising:
    obtaining scheduler context data associated with one or more mobile users/devices connected to the relay assisted cellular network;
    computing static and dynamic load values of data packets coming from the one or more mobile users/devices using the obtained scheduler context data; and
    balancing UL bandwidth utilization between the one or more mobile users or devices and a base station in the relay assisted cellular network using the computed static and dynamic load values, wherein the balancing further comprises continually adjusting throughput of each mobile user or device by adding needed weights based on a priority and a rate deficit according to a schedule.

9. The medium as set forth in claim 8 wherein the scheduler context data comprises one or more of a number of mobile devices connected to the relay assisted cellular network, a number of users of different traffic class types, random priorities of each traffic class type users, guaranteed bit rates (GBRs) for the traffic class types, an operator's operational load window, operator's running average parameters, an average initial load to start the algorithm, a constant load factor, a percentage of mobile users that is added for different traffic class types, a trigger handover (HO) constant, or an intelligent UL bandwidth load balancer enabler.

10. The medium as set forth in claim 9 wherein the number of users of different traffic class types comprises a constant bit rate (CBR), ON_OFF and statistically distributed traffic pattern.

11. The medium as set forth in claim 9 wherein the scheduler context data further comprises user context information comprising a traffic class type, an average throughput, a normalized rate deficit, and a normalized weight factor.

12. The medium as set forth in claim 8 wherein computing the static and dynamic load values comprises:
    computing UL bandwidth lower and higher operating points; and
    computing UL bandwidth load utilization for each mobile user/device requiring UL scheduling.

13. The medium as set forth in claim 8, wherein balancing UL bandwidth utilization comprises:
    re-calculating UL bandwidth load utilization and comparing with the computed UL bandwidth lower and higher operating points;

notifying any time delay/latency required for modified mobile user or device throughput; and notifying one or more hand over (HO) decisions.

14. The medium as set forth in claim 8 further comprising dynamically turning on and off the balancing of the UL bandwidth utilization in the relay assisted cellular network.

15. A load balancing computing device comprising:
a processor;
a memory, wherein the memory coupled to the processor which are configured to execute programmed instructions stored in the memory comprising:
obtaining scheduler context data associated with one or more mobile users/devices connected to the relay assisted cellular network;
computing static and dynamic load values of data packets coming from the one or more mobile users/devices using the obtained scheduler context data; and
balancing UL bandwidth utilization between the one or more mobile users/devices and a base station in the relay assisted cellular network using the computed static and dynamic load values, wherein the balancing further comprises continually adjusting throughput of each mobile user or device by adding needed weights based on a priority and a rate deficit according to a schedule.

16. The device as set forth in claim 15 wherein the scheduler context data comprises one or more of a number of mobile devices connected to the relay assisted cellular network, a number of users of different traffic class types, random priorities of each traffic class type users, guaranteed bit rates (GBRs) for the traffic class types, an operator's operational load window, operator's running average parameters, an average initial load to start the algorithm, a constant load factor, a percentage of mobile users that is added for different traffic class types, a trigger handover (HO) constant, or an intelligent UL bandwidth load balancer enabler.

17. The device as set forth in claim 16 wherein the number of users of different traffic class types comprises a constant bit rate (CBR), ON_OFF and statistically distributed traffic pattern.

18. The device as set forth in claim 16 wherein the scheduler context data further comprises user context information comprising a traffic class type, an average throughput, a normalized rate deficit, and a normalized weight factor.

19. The device as set forth in claim 15 wherein the processor is further configured to execute programmed instructions stored in the memory for the computing the static and dynamic load values comprises:
computing UL bandwidth lower and higher operating points; and
computing UL bandwidth load utilization for each mobile user or device requiring UL scheduling.

20. The device as set forth in claim 15 wherein the processor is further configured to execute programmed instructions stored in the memory for the balancing UL bandwidth utilization comprises:
re-calculating UL bandwidth load utilization and comparing with the computed UL bandwidth lower and higher operating points;
notifying any time delay/latency required for modified mobile user/device throughput; and
notifying one or more hand over (HO) decisions.

21. The device as set forth in claim 15 wherein the processor is further configured to execute programmed instructions stored in the memory further comprising dynamically turning on and off the balancing of the UL bandwidth utilization in the relay assisted cellular network.

* * * * *